(12) United States Patent
Subramanian et al.

(10) Patent No.: US 10,079,895 B2
(45) Date of Patent: Sep. 18, 2018

(54) AUTO DETECTING REMOTE SESSION PROTOCOL FOR REMOTE ACCESS

(71) Applicant: AMERICAN MEGATRENDS, INC., Norcross, GA (US)

(72) Inventors: Yugender P. Subramanian, Norcross, GA (US); Rajamanickem Sureshkumar, Chennai (IN); Jayachandran Gnanasekaran, Duluth, GA (US); Varadachari Sudan Ayanam, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 182 days.

(21) Appl. No.: 15/205,202

(22) Filed: Jul. 8, 2016

(65) Prior Publication Data

US 2018/0013837 A1    Jan. 11, 2018

(51) Int. Cl.
*G06F 15/16* (2006.01)
*H04L 29/08* (2006.01)

(52) U.S. Cl.
CPC ................... *H04L 67/141* (2013.01)

(58) Field of Classification Search
CPC .................................................. H04L 67/141
USPC .......................................................... 709/203
See application file for complete search history.

(56) References Cited

U.S. PATENT DOCUMENTS

| | | | |
|---|---|---|---|
| 8,706,839 B2 * | 4/2014 | Diamant | G06F 13/385 709/217 |
| 8,738,781 B2 * | 5/2014 | Heim | G06F 9/4416 709/227 |
| 9,063,691 B2 * | 6/2015 | Husain | G06F 3/14 |
| 9,253,158 B2 * | 2/2016 | Ringdahl | H04L 63/0263 |
| 9,256,393 B2 * | 2/2016 | Ivashin | H04L 63/10 |
| 9,325,559 B1 * | 4/2016 | Wieland | H04L 1/0091 |
| 9,430,036 B1 * | 8/2016 | Kominac | G06T 11/20 |
| 9,448,815 B2 * | 9/2016 | Pahlavan | G06F 3/1462 |
| 9,483,752 B1 * | 11/2016 | Raju | G06Q 10/10 |
| 9,535,560 B1 * | 1/2017 | Kominac | G06F 3/048 |
| 9,560,147 B2 * | 1/2017 | Shaheen | H04L 65/1016 |
| 9,578,109 B2 * | 2/2017 | Biswas | H04L 67/142 |
| 9,578,113 B2 * | 2/2017 | Sullad | H04L 67/148 |
| 9,686,323 B1 * | 6/2017 | Helter | H04L 65/1066 |
| 9,888,042 B2 * | 2/2018 | Annamalaisami | H04L 65/1069 |
| 2015/0237097 A1 * | 8/2015 | Devireddy | H04L 65/60 709/203 |
| 2017/0201589 A1 * | 7/2017 | Fiala | H04L 67/141 |
| 2017/0293767 A1 * | 10/2017 | Barton | G06F 21/606 |

\* cited by examiner

*Primary Examiner* — Melvin H Pollack
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a thin client. The thin client detects one or more remote session protocols supported by a first remote machine. The thin client determines a first remote session protocol from the one or more remote session protocols based on a first predetermined rule. The thin client determines a first protocol application from one or more protocol applications supporting the first remote session protocol based on a second predetermined rule. The thin client launches the first protocol application to establish a remote session with the first remote machine in accordance with the first remote session protocol.

20 Claims, 9 Drawing Sheets

AUTO DETECTING REMOTE SESSION PROTOCOL FOR REMOTE ACCESS

BACKGROUND

Field

The present disclosure relates generally to networked computer systems, and more particularly, to techniques of auto detecting a remote session protocol for use by a thin client to remotely access a remote machine.

Background

Computers are becoming increasingly ubiquitous, and are becoming pervasively integrated into the environment. For many users, this introduces the issue of configuring, maintaining and managing operating systems, applications and data on a number of computers.

A thin client device or zero client device is a client computer that operates in a client-server architecture. Thin clients are arranged to perform as little processing as possible, and the majority of the processing is performed by a server to which the thin client device is connected. This is in contrast to regular desktop or laptop computers (which can be considered "thick" clients), as the majority of the processing is performed on a local processor.

As the user's data, applications and operating systems are installed centrally on the server in a thin client architecture, the issue of configuring, maintaining and managing the computers becomes more manageable for the user. A single server can be arranged to support a large number of thin client devices. Furthermore, the lower amount of processing power used by a thin client device enables it to be made smaller and more power efficient than an equivalent "thick" client.

There are several protocols such as remote desktop protocol (RDP), HDX protocol, PC over IP (PCoIP) protocol, and virtual network computing (VNC) protocol that can provide remote access. Both the thin client (local machine) and server (remote machine) can support multiple protocols. It is not uncommon for client to have multiple remote client applications for each type of protocol. User typically either have to manually choose the proper application or select the protocol to be used, if not both. Therefore, there is a need to provide a more convenient mechanism for establish a remote session between a thin client and a remote machine.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a thin client. The thin client detects one or more remote session protocols supported by a first remote machine. The thin client determines a first remote session protocol from the one or more remote session protocols based on a first predetermined rule. The thin client determines a first protocol application from one or more protocol applications supporting the first remote session protocol based on a second predetermined rule. The thin client launches the first protocol application to establish a remote session with the first remote machine in accordance with the first remote session protocol.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
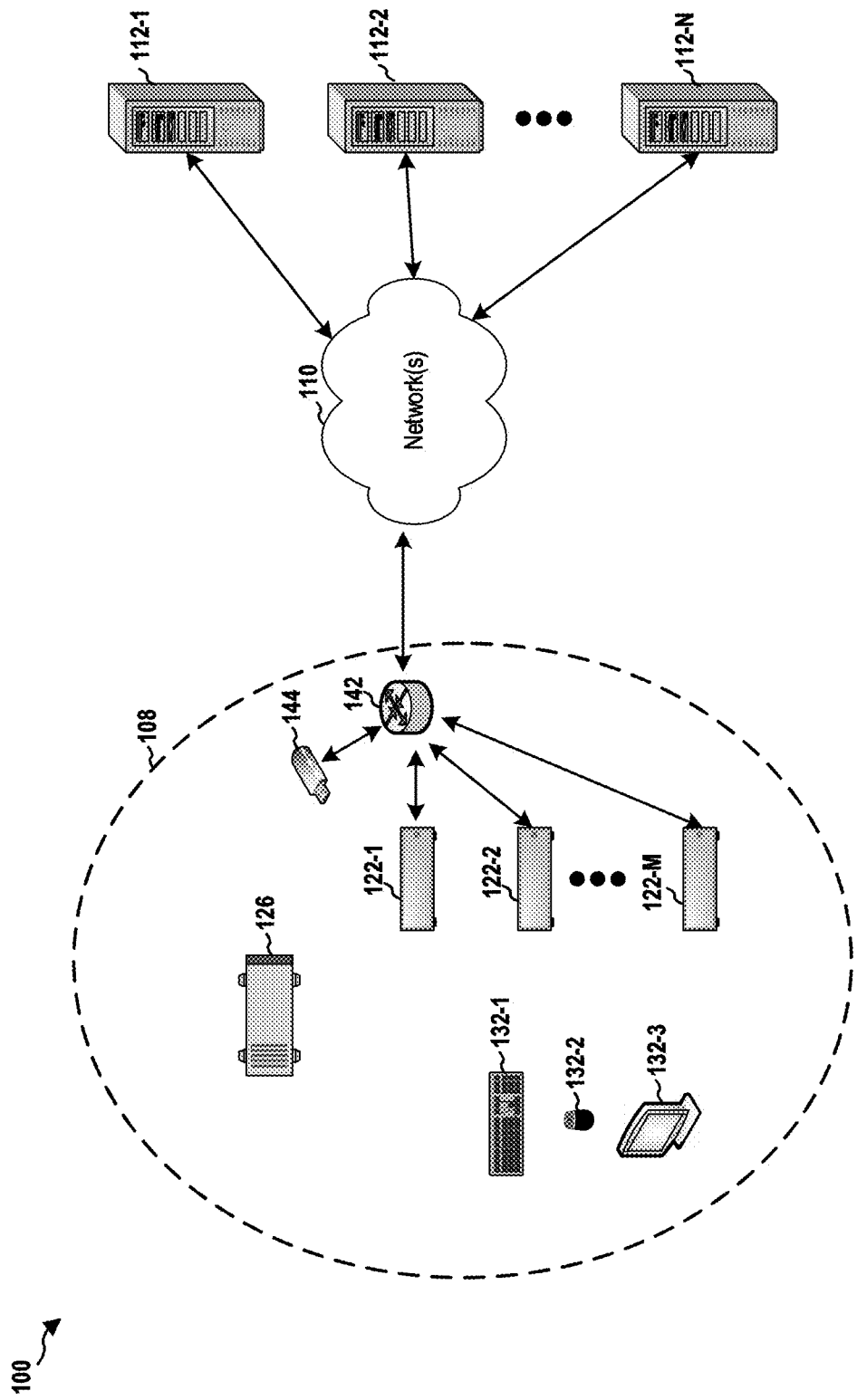
FIG. 1 is a diagram illustrating networked thin clients and remote machines.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

There are several protocols such as remote desktop protocol (RDP), HDX protocol, PC over IP (PCoIP) protocol, and virtual network computing (VNC) protocol that can provide remote access. Both the thin client (local machine) and server (remote machine) can support multiple protocols. It is not uncommon for client to have multiple remote client applications for each type of protocol. User typically either have to manually choose the proper application or select the protocol to be used, if not both. Therefore, there is a need to provide a more convenient mechanism for establish a remote session between a thin client and a remote machine. The present disclosure presents techniques of automatically detecting the protocol supported by the remote machine and enabling remote access using a protocol specific or generic client application. Further, a protocol can be selected based on a user defined order of preference when multiple protocols are supported by the remote machine.

FIG. 1 is a diagram 100 illustrating networked thin clients and remote machines. One or more of M thin clients 122-1, 122-2, . . . , 122-M each may be utilized to establish a respective session with one or more of N remote machines 112-1, 112-2, . . . , 112-N, M and N each being a respective integer greater than 0. In certain configurations, the thin clients 122-1, 122-2, . . . , 122-M may be in communication with the remote machines 112-1, 112-2, . . . , 112-N through a network 110 (e.g., Internet). Each of the remote machines 112-1, 112-2, . . . , 112-N may be a virtual machine or a physical machine. Each of the thin clients 122-1, 122-2, . . . , 122-M may be wirelessly connected with one or more peripherals, e.g., peripherals 132-1, 132-2, 132-3.

Further, a remote machine manager 126 may be utilized to manage the thin clients 122-1, 122-2, . . . , 122-M, the remote machines 112-1, 112-2, . . . , 112-N, and/or the peripherals 132-1, 132-2, 132-3. The networked peripherals, the remote machine manager 126, and the thin clients 122-1, 122-2, . . . , 122-M may be in the same LAN 108, e.g., a wireless local area network (WLAN) or a wired LAN. In certain configurations, those devices may be in a different type of network.

Figure 2:
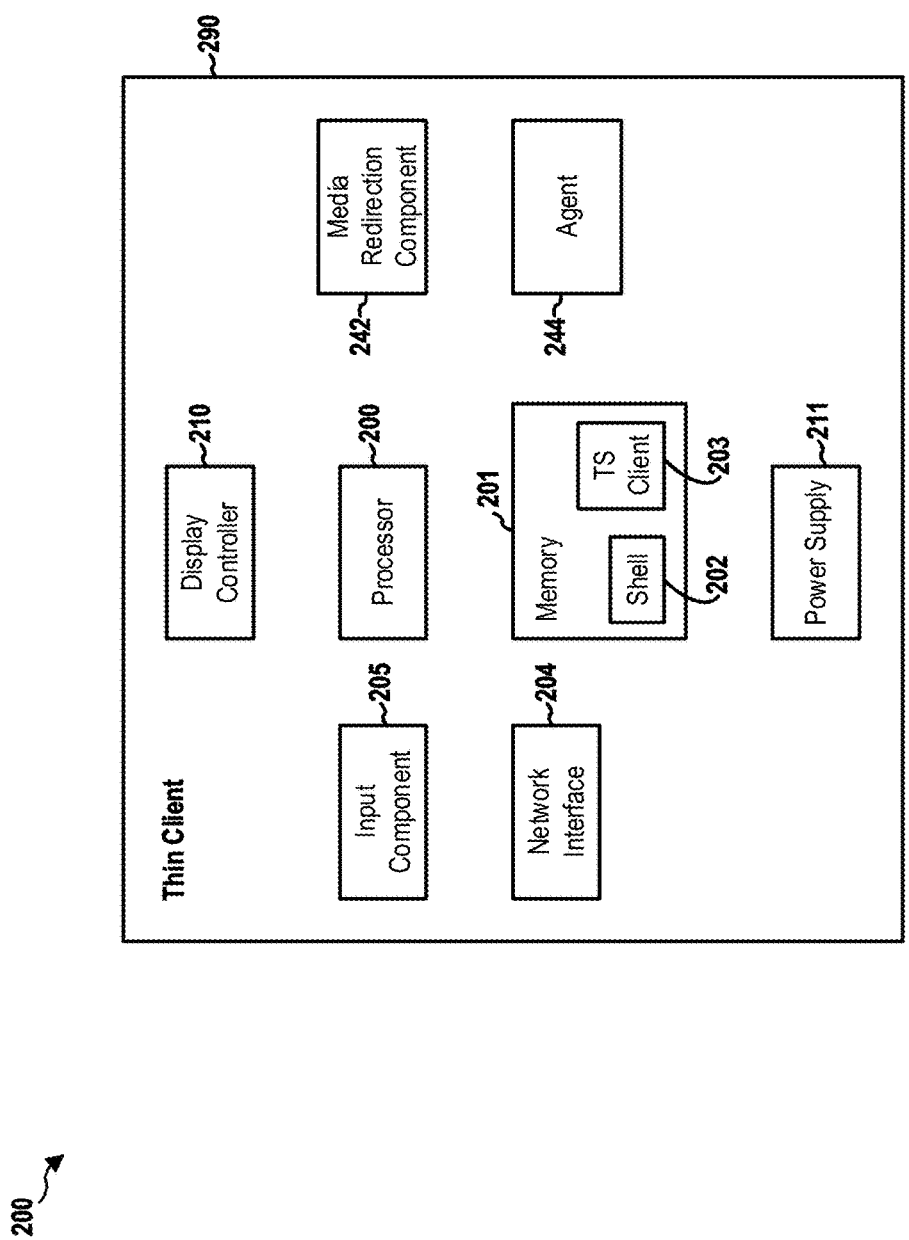
FIG. 2 is a diagram illustrating an exemplary thin client.

FIG. 2 is a diagram 200 illustrating an exemplary thin client. A thin client 290, which may be each one of the thin clients 122-1, 122-2, . . . , 122-M, includes one or more processors 200, which can be microprocessors, controllers or any other suitable type of processors for processing computing executable instructions to control the operation of the device. The computer executable instructions can be provided using any computer-readable media, such as memory 201. The memory is of any suitable type such as random access memory (RAM), a disk storage device of any type such as a magnetic or optical storage device, a hard disk drive, or a CD, DVD or other disc drive. Flash memory, EPROM or EEPROM can also be used.

The memory 201 is arranged to store software that is able to be executed on the processor 200. The memory 201 of the thin client device stores a software shell 202 and a terminal server (TS) client 203 application, the functionality of which is described in more detail infra.

A network interface 204 enables the thin client 290 to communicate over a network (in particular a wireless network) with the remote machines 112-1, 112-2, . . . , 112-N. The network interface 204 can be, for example, a WLAN interface, a cellular radio interface, a personal area network (PAN) interface, or any other suitable interface for transmitting and receiving network data. Note that in other examples, a wireless network interface can be replaced with a wired communication interface.

The thin client 290 also includes an input component 205. The input component 205 can be wirelessly connected with input peripherals (e.g., the keyboard 132-1 and the mouse 132-2) and receive input from the input peripherals.

Image output of the thin client 290 can be provided by a display controller 210. The display controller 210 may send image signals to a display peripheral. In particular, the display controller 210 may send image packets to a WLAN display via the network interface 204. The thin client 290 further comprises a power supply 211 such as a battery or a wired power source.

The thin client 290 may also include a media redirect component 242 that redirects a media device to a remote machine. Further, the thin client 290 may also include an agent 244 that can be used to communicate with the remote machine manager 126.

Figure 3:
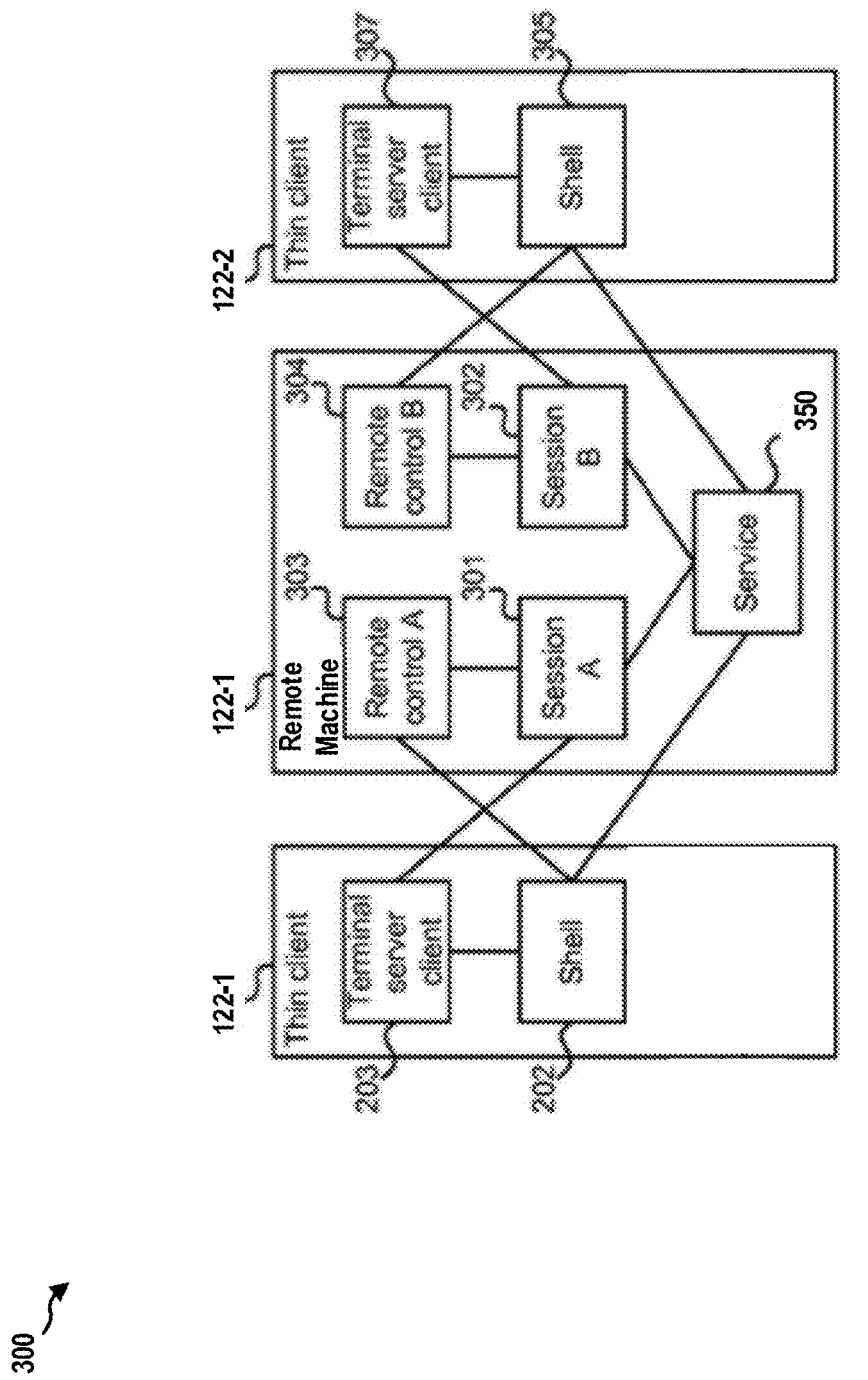
FIG. 3 is a diagram illustrating an example functional block diagram of elements in a thin client system.

FIG. 3 is a diagram 300 illustrating an example functional block diagram of the elements in a thin client system including the thin client 122-1 and the thin client 122-2 and the remote machine 112-1. The thin client 122-1 may include a shell 202 and a terminal server client 203, as described supra. The shell 202 is a lightweight control program that controls the basic operation of the thin client 122-1. In particular, the shell may determine what sessions are available on the remote machine 112-1, and may provide an interface on the display of the thin client 122-1 for the user to select a session to log into. The terminal server client 203 is a program that enables the user to interact with a particular session, and view the user interface of the session on the display of the thin client 122-1.

The remote machine 112-1 may include a software service 350 which is arranged to control and manage multiple sessions executed on the remote machine 112-1. In the example shown in FIG. 3, two sessions are running on the remote machine 112-1: session A 301 and session B 302. In other examples, more sessions could also be running on the remote machine 112-1 as well. Also note that the service 350 and sessions 301, 302 do not have to be running on the same remote machine 112-1 as shown in FIG. 3, but can be running on different remote machines. For example, instead of on the remote machine 112-1, the session 302 may be running on the remote machine 112-2.

Each session corresponds to applications and data that are accessible to one or more users. In certain configurations, a session may include a user interface of a remote desktop (i.e., a complete view of a computer desktop with several accessible applications). In certain configurations, a session may only include one or more individual applications. For example, session A 301 may correspond to a first user using a word processing application in a desktop, and session B 302 may be a stand-alone calendar application that is accessible to several users. In one example, the session is provided to the TS client 203 using a remote session protocol such as the remote desktop protocol (RDP) or virtual network computing (VNC), which may enable both desktop and application remote operation.

Each session 301, 302 on the remote machine 112-1 is optionally executing a software remote control 303, 304. The remote control 303, 304 enables the user in a session to change settings of the thin client device (even though the remote control is on the remote machine, and not on the thin client device itself). For example, these settings may include display settings at the thin client 122-1.

In the example of FIG. 3, the thin client 122-1 is accessing session A 301. The shell 202 receives data from the sensing device 206, and communicates with the TS client 203 and the service 301 on the remote machine 112-1. Session A 301 communicates with the TS client 203 and remote control A 303. Remote control A 301 communicates with the shell 202 on the thin client 122-1.

The remote machine 112-1 in FIG. 3 is also shown connected to the thin client 122-2. The thin client 122-2 has a similar structure to the thin client 122-1 in that it includes a shell 305 and a TS client 307. The thin client 122-2 is shown accessing session B 302 in FIG. 3.

Figure 4:
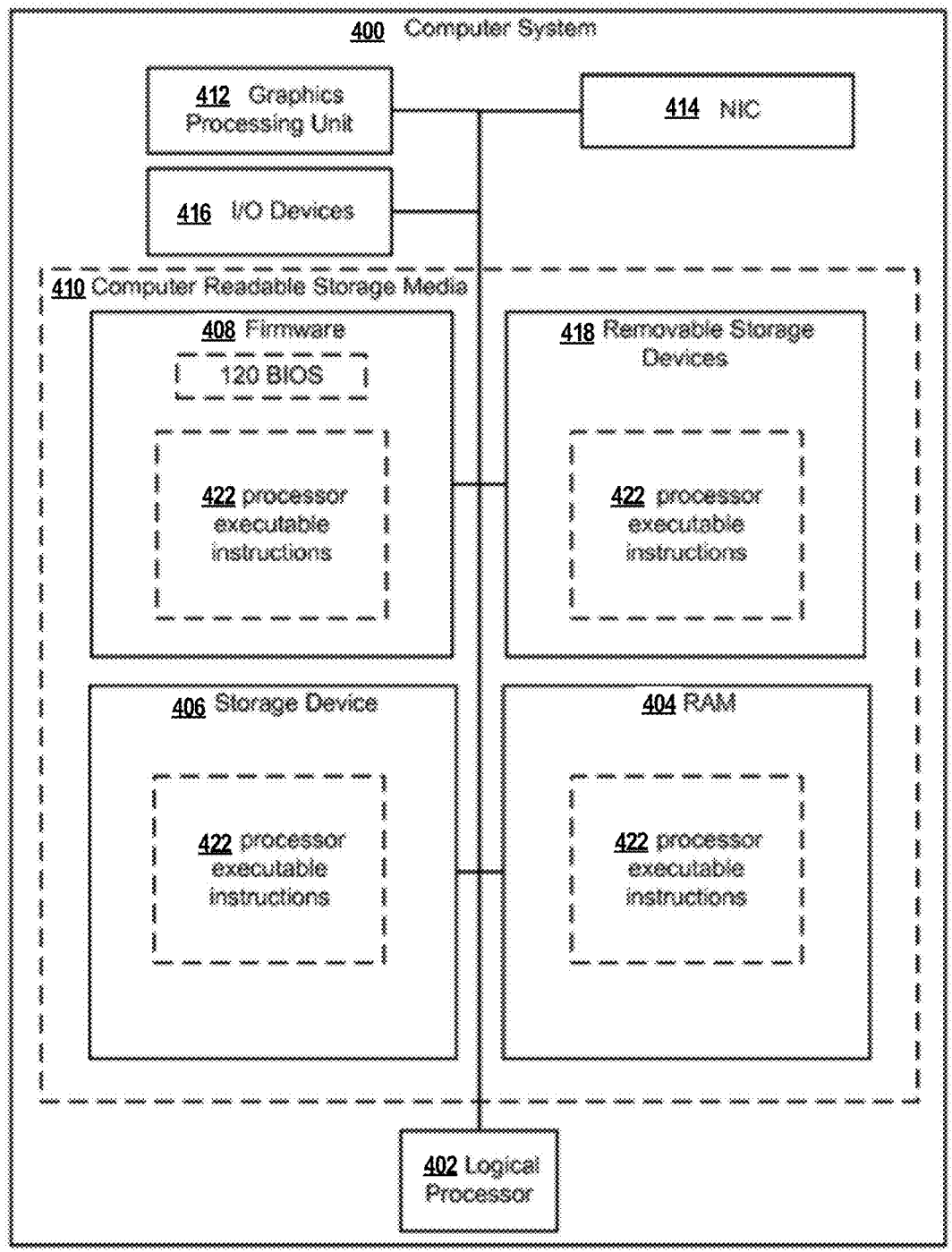
FIG. 4 is a diagram illustrating an exemplary computing system.

As described supra, each of the remote machines 112-1, 112-2, . . . , 112-N may be a virtual machine or a physical machine. Referring now to FIG. 4, an exemplary computing system 400 (i.e., a physical machine) is depicted. Computer system 400 can include logical processor 402, e.g., an execution core. While one logical processor 402 is illustrated, in other embodiments computer system 400 may have multiple logical processors, e.g., multiple execution cores per processor substrate and/or multiple processor substrates that could each have multiple execution cores. As shown by the FIG. 4, various computer readable storage media 410 can be interconnected by one or more system busses which couple various system components to the logical processor 402. The system buses may be any of several types of bus structures including a memory bus or memory controller, a peripheral bus, and a local bus using any of a variety of bus architectures. In example embodiments the computer readable storage media 410 can include for example, random access memory (RAM) 404, storage device 406, e.g., electromechanical hard drive, solid state hard drive, etc., firmware 408, e.g., FLASH RAM or ROM, and removable storage devices 418 such as, for example, CD-ROMs, floppy disks, DVDs, FLASH drives, external storage devices, etc. Other types of computer readable storage media can be used such as magnetic cassettes, flash memory cards, and/or digital video disks.

The computer readable storage media 410 can provide nonvolatile and volatile storage of processor executable instructions 422, data structures, program modules and other data for the computer 400 such as executable instructions that effectuate manager 550 described in the following figures. A basic input/output system (BIOS) 420, containing the basic routines that help to transfer information between elements within the computer system 400, such as during start up, can be stored in firmware 408. A number of programs may be stored on firmware 408, storage device 406, RAM 404, and/or removable storage devices 418, and executed by logical processor 402 including an operating system and/or application programs.

Commands and information may be received by computer 400 through input devices 416 which can include, but are not limited to, a keyboard and pointing device. Other input devices may include a microphone, joystick, game pad, scanner or the like. These and other input devices are often connected to logical processor 402 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit (GPU) 412. In addition to the display, computers typically include other peripheral output devices, such as speakers and printers (not shown). The exemplary system of FIG. 4 can also include a host adapter, Small Computer System Interface (SCSI) bus, and an external storage device connected to the SCSI bus.

Computer system 400 may operate in a networked environment using logical connections to one or more remote computers. The remote computer may be another computer, a server, a router, a network PC, a peer device or other common network node, and typically can include many or all of the elements described above relative to computer system 400.

When used in a LAN or WAN networking environment, computer system 400 can be connected to the LAN or WAN through network interface card (NIC) 414. The NIC 414, which may be internal or external, can be connected to the system bus. In a networked environment, program modules depicted relative to the computer system 400, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 5:
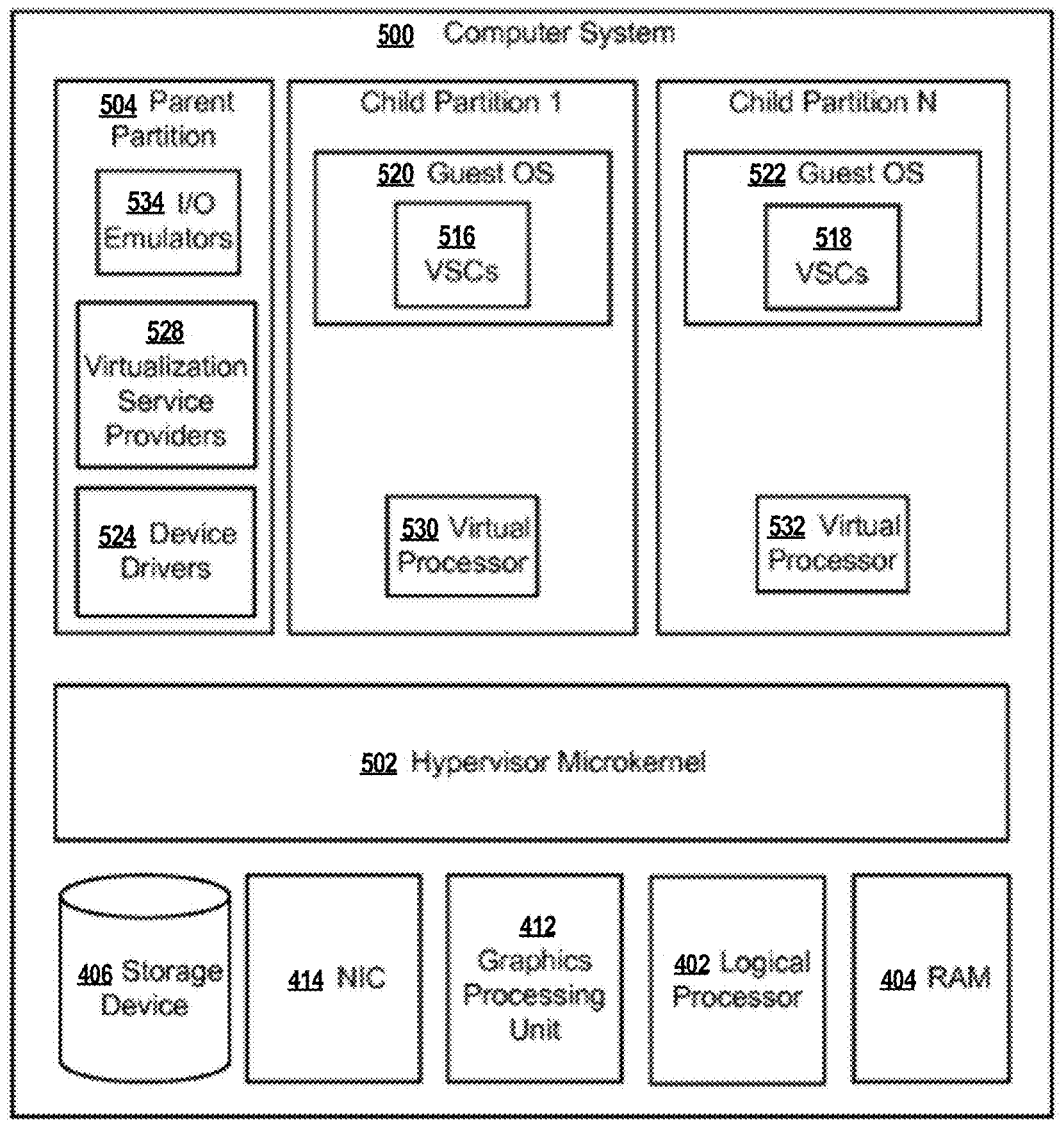
FIG. 5 is a diagram illustrating a virtual machine computing system.

Turning to FIG. 5, hypervisor microkernel 502 can be configured to control and arbitrate access to the hardware of computer system 500. The computer system 500 may employ the storage device 406, the NIC 414, the GPU 412, the logic processor 402, and the RAM 404 as described supra. Broadly, hypervisor microkernel 502 can generate execution environments called partitions such as child partition 1 through child partition N (where N is an integer greater than 1). In embodiments, a child partition is the basic unit of isolation supported by hypervisor microkernel 502. Hypervisor microkernel 502 can isolate processes in one partition from accessing another partition's resources, e.g., a guest operating system in one partition may be isolated from the memory of another partition and thus may not be able to detect memory addresses outside of its partition. Each child partition can be mapped to a set of hardware resources, e.g., memory, devices, logical processor cycles, etc., that is under control of the hypervisor microkernel 502. In embodiments hypervisor microkernel 502 can be a stand-alone software product, a part of an operating system, embedded within firmware of the motherboard, specialized integrated circuits, or a combination thereof.

Hypervisor microkernel 502 can enforce partitioning by restricting a guest operating system's view of system memory. Guest physical memory (GPM) is a partition's view of memory that is controlled by hypervisor microkernel 502. System physical memory (SPM) is the memory from the view of hypervisor microkernel 502. Pages are fixed length blocks of memory with starting and ending addresses. System physical memory can be allocated to virtual machines as guest physical memory. Thus, a page of memory allocated to a virtual machine will have a guest physical address (the address used by the virtual machine) and a system physical address (the actual address of the page). The term guest physical memory is a shorthand way of describe a page of memory from the viewpoint of a virtual machine and the term system physical memory is shorthand way of describing a page of memory from the viewpoint of the physical system.

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. Thus, a memory address may have a guest virtual address, a guest physical address, and a system physical address in an exemplary embodiment.

In the depicted example, parent partition component 504, which can also be also thought of as similar to domain 0 of Xen's open source hypervisor is illustrated. Parent partition 504 in this operational environment can be configured to provide resources to guest operating systems executing in the child partitions 1-N by using virtualization service providers 528 (VSPs) that are typically referred to as back-end drivers in the open source community. Broadly, VSPs 528 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest.

As shown by the figure, emulators 534, e.g., virtualized IDE devices, virtualized video adaptors, virtualized NICs, etc., can be configured to run within the parent partition 504 and attached to resources available to guest operating systems 520 and 522. For example, when a guest OS touches a register of a virtual device or memory mapped to the virtual device microkernel hypervisor 502 can intercept the request and pass the values the guest attempted to write to an associated emulator.

Each child partition can include one or more virtual processors (530 and 532) that guest operating systems (520 and 522) can manage and schedule threads to execute thereon. Generally, the virtual processors are executable instructions and associated state information that provide a representation of a physical processor with a specific architecture. For example, one virtual machine may have a virtual processor having characteristics of an INTEL x86 processor, whereas another virtual processor may have the characteristics of an ARM processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems (520 and 522) can be any operating system such as, for example, operating systems from MICROSOFT, APPLE, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 6:
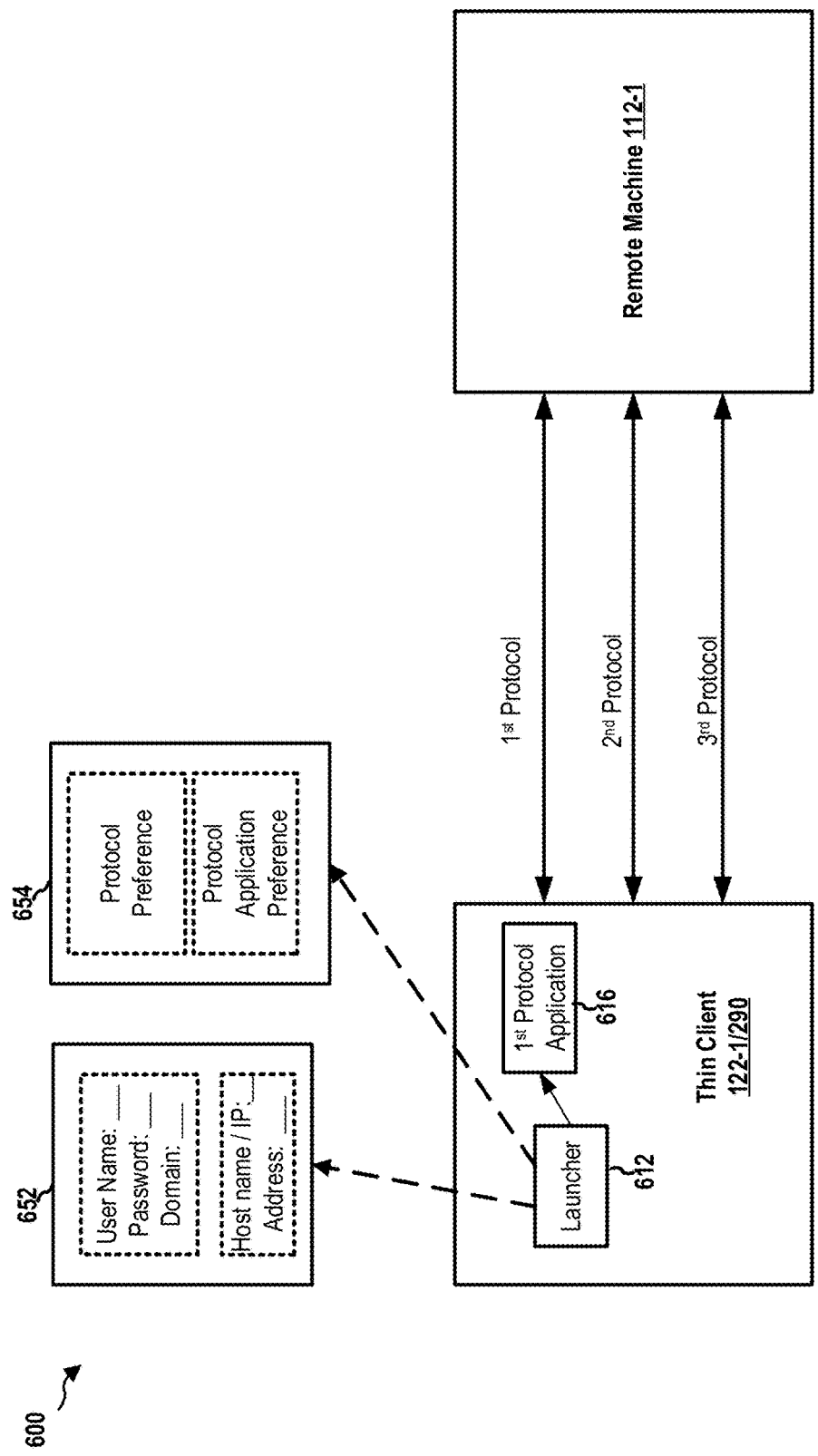
FIG. 6 is a diagram illustrating communication between a thin client and remote machine.

FIG. 6 is a diagram 600 illustrating communication between a thin client and a remote machine. Although FIG. 6 shows the thin client 122-1/thin client 290 and the remote machine 112-1, the thin client may be any of the thin clients 122-1, 122-2, . . . , 122-M and the remote machine may be any of the remote machines 112-1, 112-2, . . . , 112-N. The thin client 122-1 further includes a launcher program 612. In certain configurations, the thin client 122-1 may present an interface 652 to a user of the thin client 122-1. The interface 652 may prompt the user to enter credentials (e.g., user name and password) that can be used to establish a session with a remote machine. The interface 652 may further ask the user to input a domain associated with the credentials.

In certain configurations, the interface 652 may prompt the user to input an identifier (e.g., host name, IP address etc.) of a remote machine that the user wants to connect to. For example, the user may input the IP address of the remote machine 112-1.

In certain configurations, the thin client 122-1 may utilize a load balancer or remote machine broker such as the remote machine manager 126 to select a remote machine. In a first configuration, the interface 652 may prompt a user to input an identifier (e.g., host name, IP address etc.) of the remote machine manager 126. In a second configuration, the user may not input the identifier of the remote machine manager 126. Instead, the thin client 122-1 may use a discovery procedure to locate a web service published by the remote machine manager 126. Through communication with the web service, the thin client 122-1 may obtain an identifier of the remote machine manager 126. In certain configurations, instead of receiving the information described supra through user inputs, the thin client 122-1 may receive the information from a remote device such as the remote machine manager 126.

Subsequently, in both configurations, the launcher program 612 may request, e.g., under the instructions of the user, the remote machine manager 126 to select one of the remote machines 112-1, 112-2, . . . , 112-N for the thin client 122-1. The thin client 122-1 may optionally send requirements with respect to the remote machine, e.g., a remote machine supporting graphic intensive operations, to the remote machine manager 126. The remote machine manager 126 may have information regarding the specifications and capabilities of the remote machines 112-1, 112-2, . . . , 112-N. Thus, the remote machine manager 126 may select one remote machine that is suitable for the thin client 122-1. In addition or alternatively, the remote machine manager 126 may select a remote machine for the thin client 122-1 based on a predetermined rule, such as a random selection rule or a round robin rule. The remote machine manager 126 sends the identity of the selected thin client (in this example, the remote machine 112-1) to the thin client 122-1.

The launcher program 612 of the thin client 122-1 may be configured to support a list of remote session protocols such as remote desktop protocol (RDP), HDX protocol, PC over IP (PCoIP) protocol, and virtual network computing (VNC) protocol. After determining to connect to the remote machine 112-1 as described supra in this example, the launcher program 612 may attempt to make a connection with the remote machine 112-1 in accordance with each of the list of remote session protocols. For example, the launcher program 612 may send a request packet of a first remote session protocol (e.g., RDP) to the remote machine 112-1. When the launcher program 612 receives a response from the remote machine 112-1, the launcher program 612 may determine that the remote machine 112-1 supports the first remote session protocol. When the launcher program 612 does not receive a response from the remote machine 112-1 in a predetermined time period (e.g., 1, 3, or 5 seconds), the launcher program 612 may determine that the remote machine 112-1 does not support the first remote session protocol.

If the remote machine 112-1 supports the first remote session protocol, the launcher program 612 further communicates with the remote machine 112-1 to determine the security features of the remote session to be established in accordance with the first remote session protocol. For example, the remote session may be established over Transport Layer Security (TLS) and Secure Sockets Layer (SSL).

The remote machine 112-1 may then communicate with the remote machine 112-1 to determine the capabilities of the remote session established with the remote machine 112-1 in accordance with the first remote session protocol. For example, the capabilities may include resolutions (e.g., high definition (HD) or 4K resolution) and the number of monitors supported by the remote machine 112-1. In certain configurations, the launcher program 612 may detect a version of the first remote session protocol supported by the remote machine 112-1. The launcher program 612 may already know the features/capabilities of each version. As such, the launcher program 612 may determine the capabilities of the remote machine 112-1 based on the version of the supported remote session protocol. The launcher program 612 may store a record indicating some or all the information described supra regarding the first remote session protocol supported by the remote machine 112-1.

Subsequently, the launcher program 612 may repeat the procedures described infra for each of the rest on the list of remote session protocols supported by the thin client 122-1. As such, the launcher program 612 may generate a record of the remote session protocols supported by the thin client 122-1 and relevant information.

Further, the launcher program 612 may be configured with priorities of the remote session protocols for establishing remote sessions when multiple remote session protocols are supported by a remote machine. The launcher program 612 may assign priorities to the remote session protocols supported by the launcher program 612. For example, RDP may have the top priority, and HDX may have the second priority, and so on. Accordingly, the launcher program 612 may select a remote session protocol from the remote session protocols supported by the remote machine 112-1 for establishing a remote session with the remote machine 112-1 based on the priorities. In this example, the launcher program 612 may determine to use the first remote session protocol (e.g., RDP) when it is supported, as the first remote session protocol has the top priority.

Further, the launcher program 612 may determine the capabilities and configurations of the thin client 122-1, and then may determine a best suitable remote session protocol based on the capabilities and configurations of the thin client 122-1 and the capabilities and configurations of the remote session protocol supported by the remote machine 112-1 detected previously. For example, if the thin client 122-1 supports 4K resolution but only the remote session protocol of the second priority supports 4K resolution, the launcher program 612 may determine to use the remote session protocol of the second priority to establish a remote session, even if the remote session protocol of the first priority is also available.

In certain circumstances, the launcher program 612 may provide an interface 654 that prompt a user to enter his/her preferences of the remote session protocols. Accordingly, the launcher program 612 may select one from the available remote session protocols based on the user's preferences.

Further, for a particular remote session protocol, the thin client 122-1 may have more than one protocol application that can used to establish a remote session with a remote machine. A protocol application is a client application that can establish a remote session in compliance with a particular remote session protocol (e.g., an RDP client). A protocol application may be the TS client 203. The interface 654 may further prompt the user to enter his/her preferences (or priorities) for the more than one protocol application. Accordingly, the launcher program 612 may determine a protocol application from the protocol applications available for the particular remote session protocol for establishing a remote session with the remote machine 112-1 based on the preferences.

Further, the launcher program 612 may further determine the capabilities and configurations of the more than one protocol application, and then may determine a best suitable protocol application based on the capabilities and configurations of the protocol application and the capabilities and configurations of the particular remote session protocol. For example, if the particular remote session protocol supports 4K resolution but only the protocol application of the second preference supports 4K resolution, the launcher program 612 may determine to use the protocol application of the second preference to establish a remote session, instead of using the protocol application of the first preference.

As such, after selecting a particular remote session protocol for establishing a remote session with the remote machine 112-1, the launcher program 612 may further launch a selected particular protocol application (e.g., a first protocol application 616) to establish the remote session. More specifically, the launcher program 612 may launch the particular protocol application through an application program interface (API) or a hook of the particular protocol application, or a command line tool. The launcher program 612 may also retrieve the user credentials and optionally user settings (e.g., stored in a storage device of the thin client 122-1) and input them to the particular protocol application such that the particular protocol application can establish a remote session with the remote machine 112-1 based on the user credentials and settings.

Figure 7:
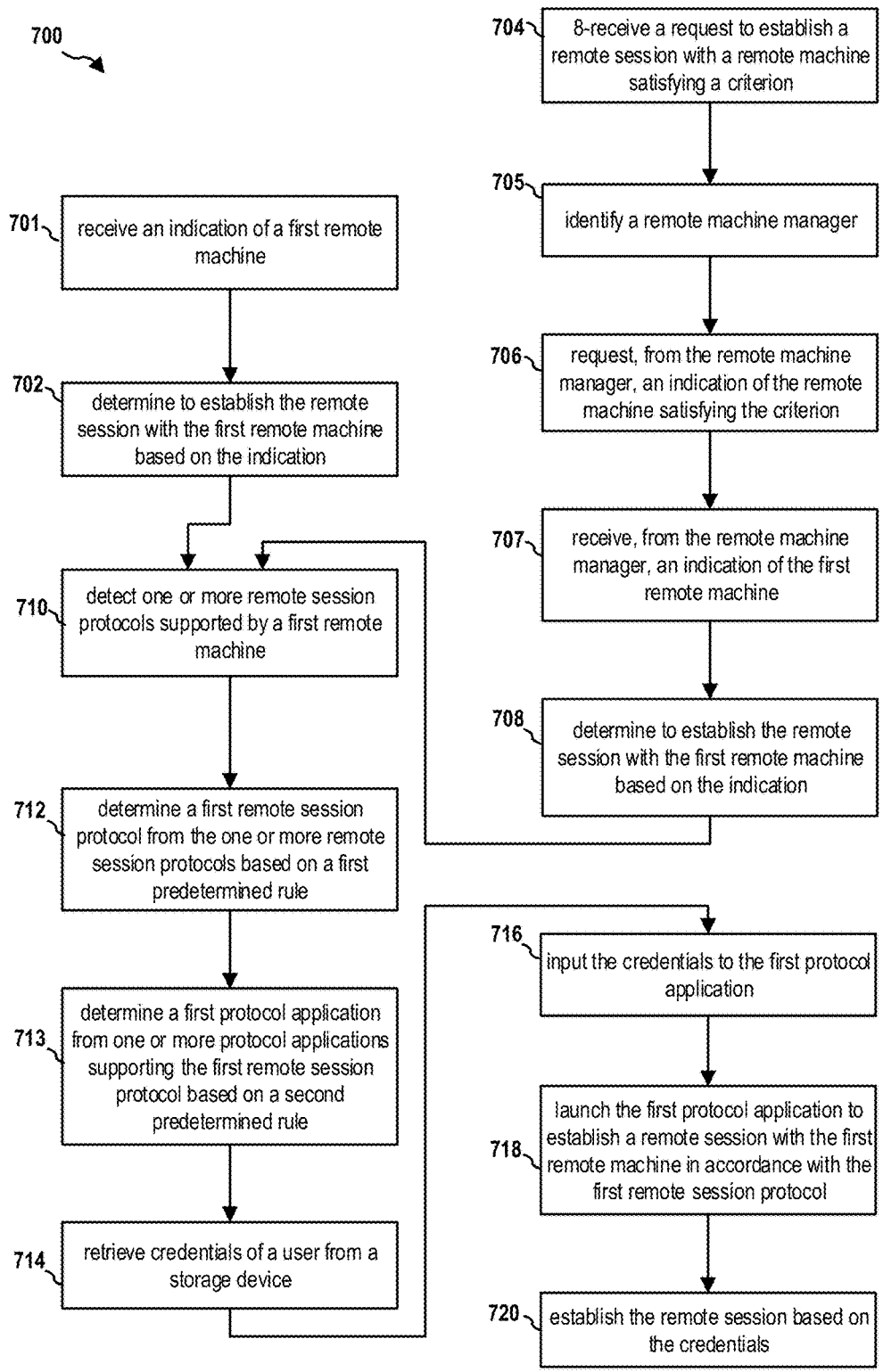
FIG. 7 is a flow chart of a method (process) for operating a thin client.

FIG. 7 is a flow chart 700 of a method (process) for operating a thin client. The method may be performed by a control device (e.g., the remote machine manager 126 and the apparatus 802/802'). In a first configuration, at operation 701, the thin client receives an indication of a first remote machine. The first remote machine may be a virtual machine. The first remote machine may alternatively be a physical machine. At operation 702, the thin client determines to establish the remote session with the first remote machine based on the indication. Then the thin client enters operation 710.

In a second configuration, at operation 704, the thin client receives a request to establish a remote session with a remote machine satisfying a criterion. At operation 705, the thin client identifies a remote machine manager. At operation 706, the thin client requests, from the remote machine manager, an indication of the remote machine satisfying the criterion. At operation 707, the thin client receives, from the remote machine manager, an indication of the first remote machine. At operation 708, the thin client determines to establish the remote session with the first remote machine based on the indication. Then the thin client enters operation 710.

At operation 710, the thin client detects one or more remote session protocols supported by the first remote machine. At operation 712, the thin client determines a first remote session protocol from the one or more remote session protocols based on a first predetermined rule. In certain configurations, the first predetermined rule indicates priorities of the one or more remote session protocols. At operation 713, the thin client determines a first protocol application from one or more protocol applications supporting the first remote session protocol based on a second predetermined rule. In certain configurations, the second predetermined rule indicates priorities of the one or more protocol applications. At operation 714, the thin client retrieves credentials of a user from a storage device. At operation 716, the thin client inputs the credentials to the first protocol application. At operation 718, the thin client launches the first protocol application to establish a remote session with the first remote machine in accordance with the first remote session protocol. At operation 720, the thin client establishes the remote session based on the credentials.

Figure 8:
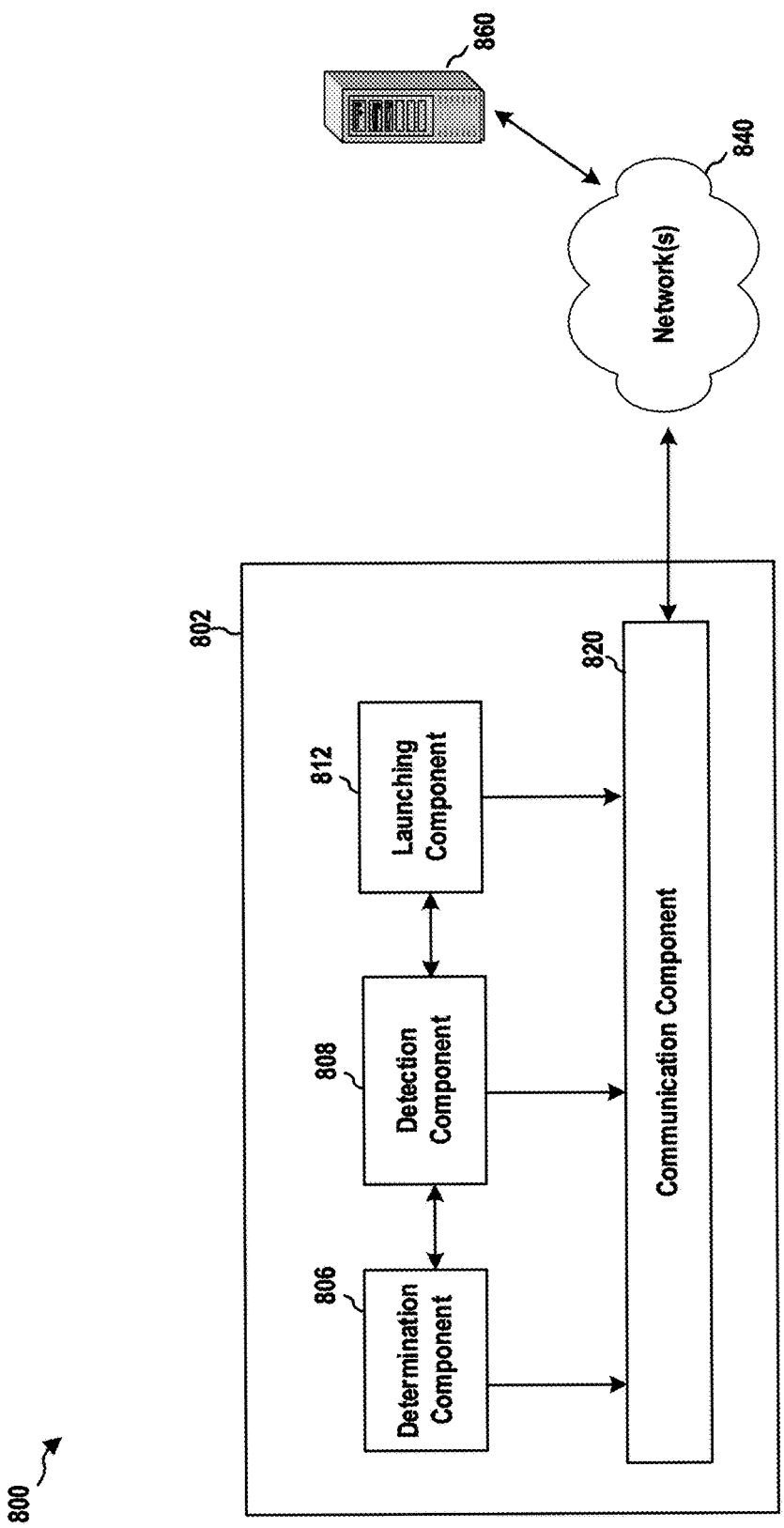
FIG. 8 is a conceptual data flow diagram illustrating the data flow between different means/components in an exemplary apparatus.

FIG. 8 is a conceptual data flow diagram 800 illustrating the data flow between different components/means in an exemplary apparatus 802. The apparatus 802 may a thin client (e.g., the thin clients 122-1, 122-2, . . . , 122-M). The apparatus 802 includes, among other components, a determination component 806, a detection component 808, a launching component 812, and a communication component 820. The apparatus 802 may be in communication with, through one or more networks 840, a first remote machine 860.

In a first configuration, the determination component 806 receives an indication of the first remote machine 860. The first remote machine 860 may be a virtual machine. The first remote machine 860 may alternatively be a physical machine. The determination component 806 determines to establish the remote session with the first remote machine 860 based on the indication.

In a second configuration, the determination component 806 receives a request to establish a remote session with a remote machine satisfying a criterion. The determination component 806 identifies a remote machine manager. The determination component 806 requests, from the remote machine manager, an indication of the remote machine satisfying the criterion. The determination component 806 receives, from the remote machine manager, an indication of the first remote machine 860. The determination component 806 determines to establish the remote session with the first remote machine 860 based on the indication.

The detection component 808 detects one or more remote session protocols supported by a first remote machine 860. The determination component 806 determines a first remote session protocol from the one or more remote session protocols based on a first predetermined rule. In certain configurations, the first predetermined rule indicates priorities of the one or more remote session protocols. The determination component 806 determines a first protocol application from one or more protocol applications supporting the first remote session protocol based on a second predetermined rule. In certain configurations, the second predetermined rule indicates priorities of the one or more protocol applications. The launching component 812 retrieves credentials of a user from a storage device. The launching component 812 inputs the credentials to the first protocol application. The launching component 812 launches the first protocol application to establish a remote session with the first remote machine 860 in accordance with the first remote session protocol. The first protocol application establishes the remote session based on the credentials.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
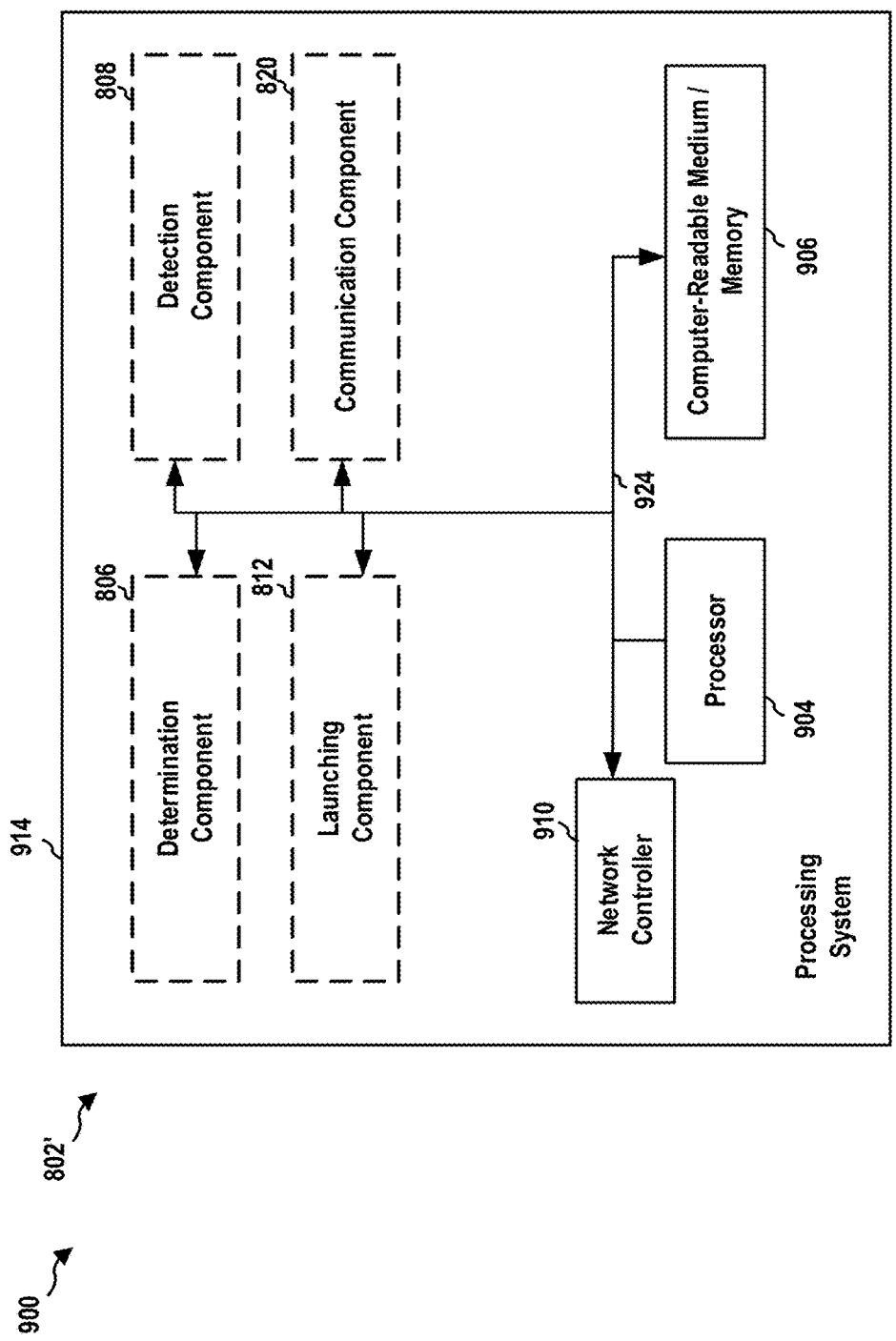
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware components, represented by the processor 904, the components 806, 808, 812, 820, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a network controller 910. The network controller 910 provides a means for communicating with various other apparatus over a network. The network controller 910 receives a signal from the network, extracts information from the received signal, and provides the extracted information to the processing system 914, specifically the communication component 820. In addition, the network controller 910 receives information from the processing system 914, specifically the communication component 820, and based on the received information, generates a signal to be sent to the network. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the components 806, 808, 812, 820. The components may be software components running in the processor 904, resident/stored in the computer readable medium/memory 906, one or more hardware components coupled to the processor 904, or some combination thereof.

The apparatus 802/802' may be configured to include means for performing each of the operations described supra referring to FIG. 7. The aforementioned means may be one or more of the aforementioned components of the apparatus 802 and/or the processing system 914 of the apparatus 802' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a thin client, comprising:
   detecting one or more remote session protocols supported by a first remote machine, each of the one or more remote session protocols being for establishing a user interface of a remote desktop at the first remote machine;
   determining, at the thin client, a first remote session protocol from the one or more remote session protocols based on a first predetermined rule, the first predetermined rule indicates priorities of the one or more remote session protocols;
   determining a first protocol application from one or more protocol applications supporting the first remote session protocol based on a second predetermined rule; and
   launching the first protocol application to establish a remote session with the first remote machine in accordance with the first remote session protocol.

2. The method of claim 1, wherein the first remote machine is a virtual machine.

3. The method of claim 1, wherein the first remote machine is a physical machine.

4. The method of claim 1, wherein the first predetermined rule indicates that a candidate session protocol is to be selected when the candidate session protocol supports a maximum capacity of the thin client.

5. The method of claim 1, wherein the second predetermined rule indicates priorities of the one or more protocol applications.

6. The method of claim 1, further comprising:
   retrieving credentials of a user from a storage device;
   inputting the credentials to the first protocol application; and
   establishing the remote session based on the credentials.

7. The method of claim 1, further comprising:
   receiving an indication of the first remote machine; and
   determining to establish the remote session with the first remote machine based on the indication.

8. The method of claim 1, further comprising:
   receiving a request to establish a remote session with a remote machine satisfying a criterion;
   identifying a remote machine manager;
   requesting, from the remote machine manager, an indication of the remote machine satisfying the criterion;
   receiving, from the remote machine manager, an indication of the first remote machine; and
   determining to establish the remote session with the first remote machine based on the indication.

9. An apparatus, the apparatus being a thin client, comprising:
   a memory; and
   at least one processor coupled to the memory and configured to:
      detect one or more remote session protocols supported by a first remote machine, each of the one or more remote session protocols being for establishing a user interface of a remote desktop at the first remote machine;
      determine, at the thin client, a first remote session protocol from the one or more remote session protocols based on a first predetermined rule, the first predetermined rule indicates priorities of the one or more remote session protocols;

determine a first protocol application from one or more protocol applications supporting the first remote session protocol based on a second predetermined rule; and launch the first protocol application to establish a remote session with the first remote machine in accordance with the first remote session protocol.

10. The apparatus of claim 9, wherein the first predetermined rule indicates priorities of the one or more remote session protocols.

11. The apparatus of claim 9, wherein the second predetermined rule indicates that a candidate session protocol is to be selected when the candidate session protocol supports a maximum capacity of the thin client.

12. The apparatus of claim 9, wherein the at least one processor is further configured to:
retrieve credentials of a user from a storage device;
input the credentials to the first protocol application; and
establish the remote session based on the credentials.

13. The apparatus of claim 9, wherein the at least one processor is further configured to:
receive an indication of the first remote machine; and
determine to establish the remote session with the first remote machine based on the indication.

14. The apparatus of claim 9, wherein the at least one processor is further configured to:
receive a request to establish a remote session with a remote machine satisfying a criterion;
identify a remote machine manager;
request, from the remote machine manager, an indication of the remote machine satisfying the criterion;
receive, from the remote machine manager, an indication of the first remote machine; and
determine to establish the remote session with the first remote machine based on the indication.

15. A computer-readable medium storing computer executable code for operating a thin client, comprising code to:
detect one or more remote session protocols supported by a first remote machine, each of the one or more remote session protocols being for establishing a user interface of a remote desktop at the first remote machine;

determine, at the thin client, a first remote session protocol from the one or more remote session protocols based on a first predetermined rule, the first predetermined rule indicates priorities of the one or more remote session protocols;

determine a first protocol application from one or more protocol applications supporting the first remote session protocol based on a second predetermined rule; and launch the first protocol application to establish a remote session with the first remote machine in accordance with the first remote session protocol.

16. The apparatus of claim 15, wherein the first predetermined rule indicates that a candidate session protocol is to be selected when the candidate session protocol supports a maximum capacity of the thin client.

17. The apparatus of claim 15, wherein the second predetermined rule indicates priorities of the one or more protocol applications.

18. The apparatus of claim 15, wherein the code is further configured to:
retrieve credentials of a user from a storage device;
input the credentials to the first protocol application; and
establish the remote session based on the credentials.

19. The apparatus of claim 15, wherein the code is further configured to:
receive an indication of the first remote machine; and
determine to establish the remote session with the first remote machine based on the indication.

20. The apparatus of claim 15, wherein the code is further configured to:
receive a request to establish a remote session with a remote machine satisfying a criterion;
identify a remote machine manager;
request, from the remote machine manager, an indication of the remote machine satisfying the criterion;
receive, from the remote machine manager, an indication of the first remote machine; and
determine to establish the remote session with the first remote machine based on the indication.

* * * * *